United States Patent
Philip et al.

(10) Patent No.: US 11,972,512 B2
(45) Date of Patent: Apr. 30, 2024

(54) DIRECTIONAL EDITING OF DIGITAL IMAGES

(71) Applicant: Adobe Inc., San Jose, CA (US)

(72) Inventors: Julien Philip, Greater London (GB); David Nicholson Griffiths, Greater London (GB)

(73) Assignee: Adobe Inc., San Jose, CA (US)

( * ) Notice: Subject to any disclaimer, the term of this patent is extended or adjusted under 35 U.S.C. 154(b) by 121 days.

(21) Appl. No.: 17/583,600

(22) Filed: Jan. 25, 2022

(65) Prior Publication Data

US 2023/0237718 A1 Jul. 27, 2023

(51) Int. Cl.
| | |
|---|---|
| G06T 11/60 | (2006.01) |
| G06T 7/50 | (2017.01) |
| G06T 7/90 | (2017.01) |
| G06T 15/06 | (2011.01) |
| G06T 15/50 | (2011.01) |

(52) U.S. Cl.
CPC ............. *G06T 11/60* (2013.01); *G06T 7/50* (2017.01); *G06T 7/90* (2017.01); *G06T 15/06* (2013.01); *G06T 15/50* (2013.01); *G06T 2207/20081* (2013.01); *G06T 2207/20084* (2013.01)

(58) Field of Classification Search
CPC .. G06T 7/50; G06T 7/90; G06T 15/06; G06T 2207/20081; G06T 2207/20084
See application file for complete search history.

(56) References Cited

U.S. PATENT DOCUMENTS

| | | | |
|---|---|---|---|
| 2020/0175700 A1* | 6/2020 | Zhang | G06V 10/26 |
| 2020/0380762 A1* | 12/2020 | Karafin | G02B 27/0101 |
| 2021/0082185 A1* | 3/2021 | Ziegler | G06T 15/50 |
| 2023/0091487 A1* | 3/2023 | Lee | G06T 5/005 |
| | | | 382/128 |
| 2023/0140881 A1* | 5/2023 | De Sisternes | G06T 7/0012 |
| | | | 382/130 |

OTHER PUBLICATIONS

"Evermotion Archexteriors vol. 37", Evermotion [retrieved Dec. 9, 2021]. Retrieved from the Internet <https://evermotion.org/files/pdf/archexteriors_vol_37.pdf>., 2021, 6 Pages.

(Continued)

*Primary Examiner* — Samantha (Yuehan) Wang
(74) *Attorney, Agent, or Firm* — FIG. 1 Patents

(57) ABSTRACT

Directional propagation editing techniques are described, in one example, a digital image, a depth map, and a direction are obtained by an image editing system. The image editing system then generates features. To do so, the image editing system generates features from the digital image and the depth map for each pixel based on the direction, e.g., until an edge of the digital image is reached. In an implementation, instead of storing a value of the depth directly, a ratio is stored based on a depth in the depth map and a depth of a point along the direction. The image editing system then forms a feature volume using the features, e.g., as three dimensionally stacked features. The feature volume is employed by the image editing system as part of editing the digital image to form an edited digital image.

20 Claims, 13 Drawing Sheets

(56) References Cited

OTHER PUBLICATIONS

Bi, Sai, et al., "Deep Reflectance vols. Relightable Reconstructions from Multi-view Photometric Images", Cornell University arXiv, arXiv.org [retrieved Dec. 6, 2021]. Retrieved from the Internet <https://arxiv.org/pdf/2007.09892.pdf>., Jul. 20, 2020, 21 Pages.

Bi, Sai, et al., "Neural Reflectance Fields for Appearance Acquisition", Cornell University arXiv, arXiv.org [retrieved Dec. 6, 2021]. Retrieved from the Internet <https://arxiv.org/pdf/2008.03824.pdf>., Aug. 16, 2020, 11 Pages.

Carlson, Alexandra, et al., "Shadow Transfer: Single Image Relighting for Urban Road Scenes", Cornell University arXiv, arXiv.org [retrieved Dec. 6, 2021]. Retrieved from the Internet <https://arxiv.org/pdf/1909.10363.pdf>., Sep. 26, 2019, 8 Pages.

Debevec, Paul, et al., "Acquiring the reflectance field of a human face", SIGGRAPH '00: Proceedings of the 27th annual conference on Computer graphics and interactive techniques [retrieved Dec. 6, 2021]. Retrieved from the Internet <https://www.pauldebevec.com/Research/LS/debevec-siggraph2000-high.pdf>., Jul. 2000, 12 Pages.

Debevec, Paul, "Image-based lighting", ACM SIGGRAPH 2006 Courses [retrieved Dec. 6, 2021]. Retrieved from the Internet <https://picture.iczhiku.com/resource/paper/syKwkFrtsFDahxCb.pdf>., Jul. 2006, 9 Pages.

Dou, Hang, et al., "Adaptive depth bias for shadow maps", Proceedings of the 18th meeting of the ACM SIGGRAPH Symposium on Interactive 3D Graphics and Games [retrieved Dec. 9, 2021]. Retrieved from the Internet <https://www.icgt.org/published/0003/04/08/paper-lowres.pdf>., Mar. 14, 2014, 17 Pages.

Duchêne, Sylvain, et al., "Multi-View Intrinsic Images of Outdoors Scenes with an Application to Relighting", ACM Transactions on Graphics vol. 34, No. 5 [retrieved Dec. 6, 2021]. Retrieved from the Internet <https://doi.org/10.1145/2756549>, Jun. 18, 2015, 17 Pages.

Eigen, David, et al., "Predicting Depth, Surface Normals and Semantic Labels With a Common Multi-Scale Convolutional Architecture", Cornell University arXiv, arXiv.org [retrieved Dec. 9, 2021]. Retrieved from the Internet <https://arxiv.org/pdf/1411.4734.pdf>., Dec. 17, 2015, 9 Pages.

Einabadi, Farshad, et al., "Deep Neural Models for Illumination Estimation and Relighting: A Survey", Computer Graphics Forum, vol. 40, No. 6 [retrieved Dec. 9, 2021]. Retrieved from the Internet <https://onlinelibrary.wiley.com/doi/10.1111/cgf.14283>., Jun. 9, 2021, 38 Pages.

Eisemann, Elmar, et al., "Flash Photography Enhancement via Intrinsic Relighting", ACM Transactions on Graphics vol. 23, Issue 3 [retrieved Dec. 9, 2021]. Retrieved from the Internet <https://citeseerx.ist.psu.edu/viewdoc/download?doi=10.1.1.85.9917&rep=rep1&type=pdf>., Aug. 1, 2004, 7 pages.

Gardner, Marc-Andre, et al., "Deep Parametric Indoor Lighting Estimation", Cornell University arXiv, arXiv.org [retrieved Dec. 9, 2021]. Retrieved from the Internet <https://arxiv.org/pdf/1910.08812.pdf>., Oct. 19, 2019, 9 Pages.

Guo, Kaiwen, et al., "The relightables: volumetric performance capture of humans with realistic relighting Share on", ACM Transactions on Graphics, vol. 38, No. 6 [retrieved Dec. 9, 2021]. Retrieved from the Internet <https://dl.acm.org/doi/pdf/10.1145/3355089.3356571>., Nov. 8, 2019, 19 Pages.

He, Yihui, et al., "Epipolar Transformers", Cornell University arXiv, arXiv.org [retrieved Dec. 9, 2021]. Retrieved from the Internet <https://arxiv.org/pdf/2005.04551.pdf>., May 10, 2020, 13 Pages.

Henzler, Philipp, et al., "Escaping Plato's Cave: 3D Shape From Adversarial Rendering", Cornell University arXiv, arXiv.org [retrieved Dec. 9, 2021]. Retrieved from the Internet <https://arxiv.org/pdf/1811.11606.pdf>., Jun. 10, 2021, 11 Pages.

Hold-Geoffroy, Yannick, et al., "Deep Outdoor Illumination Estimation", Cornell University arXiv, arXiv.org [retrieved Dec. 9, 2021]. Retrieved from the Internet <https://arxiv.org/pdf/1611.06403.pdf>., Apr. 11, 2018, 10 Pages.

Hold-Geoffroy, Yannick, et al., "Deep Sky Modeling for Single Image Outdoor Lighting Estimation", Cornell University arXiv, arXiv.org [retrieved Dec. 9, 2021]. Retrieved from the Internet <https://arxiv.org/pdf/1905.03897.pdf>., May 10, 2019, 9 Pages.

Isola, Phillip, et al., "Image-to-Image Translation with Conditional Adversarial Networks", 2017 IEEE Conference on Computer Vision and Pattern Recognition (CVPR) [retrieved Feb. 24, 2022]. Retrieved from the Internet <https://gangw.web.illinois.edu/class/cs598/papers/CVPR17-img2img.pdf>., Nov. 22, 2017, 17 pages.

Kanamori, Yoshihiro, et al., "Relighting Humans: Occlusion-Aware Inverse Rendering for Full-Body Human Images", Cornell University arXiv, arXiv.org [retrieved Dec. 9, 2021]. Retrieved from the Internet <https://arxiv.org/pdf/1908.02714.pdf>., Aug. 7, 2019, 11 Pages.

Karsch, Kevin, et al., "Rendering Synthetic Objects into Legacy Photographs", Cornell University arXiv, arXiv.org [retrieved Dec. 9, 2021]. Retrieved from the Internet <https://arxiv.org/pdf/1912.11565.pdf>., Dec. 1, 2011, 12 pages.

Kettunen, Markus, et al., "E-LPIPS: Robust Perceptual Image Similarity via Random Transformation Ensembles", Cornell University arXiv, arXiv.org [retrieved Dec. 9, 2021]. Retrieved from the Internet <https://arxiv.org/pdf/1906.03973.pdf>., Jun. 11, 2019, 10 Pages.

Kholgade, Natasha, et al., "3D object manipulation in a single photograph using stock 3D models", ACM Transactions on Graphics, vol. 33, No. 4 [retrieved Dec. 9, 2021]. Retrieved from the Internet <https://www.cs.cmu.edu/~om3d/papers/SIGGRAPH2014.pdf>., Jul. 27, 2014, 13 Pages.

Kingma, Diederik P, et al., "Adam: A Method for Stochastic Optimization", Cornell University, arXiv Preprint, arXiv. org [retrieved Sep. 16, 2021]. Retrieved from the Internet <https://arxiv.org/pdf/1412.6980.pdf>., Jan. 30, 2017, 15 pages.

Kopf, Johannes, et al., "Deep Photo: Model-Based Photograph Enhancement and Viewing", ACM Transactions on Graphics, Proceedings of SIGGRAPH Asia vol. 27, No. 5 [retrieved Dec. 9, 2021]. Retrieved from the Internet <https://doi.org/10.1145/1409060.1409069>., Dec. 2008, 10 pages.

Lalonde, Jean-François, et al., "Estimating natural illumination from a single outdoor image", 2009 IEEE 12th International Conference on Computer Vision (ICCV) [retrieved Dec. 9, 2021]. Retrieved from the Internet <http://graphics.cs.cmu.edu/people/jlalonde/pubs/papers/lalonde_iccv_09.pdf>., 2009, 8 Pages.

Land, Edwin H, et al., "Lightness and Retinex Theory", Journal of the Optical Society of America, vol. 61, No. 1 [retrieved Dec. 9, 2021]. Retrieved from the Internet <http://www.mcimg.us/Retinex/Retinex_files/L%26M1971.pdf>., Jan. 1971, 11 pages.

Li, Zhengqin, et al., "Inverse Rendering for Complex Indoor Scenes: Shape, Spatially-Varying Lighting and SVBRDF From a Single Image", Cornell University arXiv, arXiv.org [retrieved Dec. 9, 2021]. Retrieved from the Internet <https://arxiv.org/pdf/1905.02722.pdf>., May 7, 2019, 18 Pages.

Liu, Daquan, et al., "ARShadowGAN: Shadow Generative Adversarial Network for Augmented Reality in Single Light Scenes", 2020 IEEE/CVF Conference on Computer Vision and Pattern Recognition (CVPR) [retrieved Dec. 9, 2021]. Retrieved from the Internet <https://www.chengjianglong.com/publications/ARShadowGAN_CVPR.pdf>., Jun. 13, 2020, 10 Pages.

Liu, Andrew, et al., "Learning to Factorize and Relight a City", Cornell University arXiv, arXiv.org [retrieved Dec. 9, 2021]. Retrieved from the Internet <https://arxiv.org/pdf/2008.02796.pdf>., Aug. 6, 2020, 35 Pages.

Loscos, Céline, et al., "Interactive Virtual Relighting and Remodeling of Real Scenes", EGWR'99: Proceedings of the 10th Eurographics conference on Rendering [retrieved Dec. 9, 2021]. Retrieved from the Internet <https://hal.inria.fr/inria-00069942/document>., May 19, 2006, 20 Pages.

Loscos, C'eline, et al., "Interactive Virtual Relighting of Real Scenes", IEEE Transactions on Visualization and Computer Graphics [retrieved Dec. 9, 2021]. Retrieved from the Internet <https://maverick.inria.fr/Publications/2000/LDR00/tvcgFinal.pdf>., Oct. 2000, 21 Pages.

Mao, Xudong, et al., "Least Squares Generative Adversarial Networks", IEEE Transactions on Pattern Analysis and Machine

(56) References Cited

OTHER PUBLICATIONS

Intelligence, vol. 41, No. 12, [retrieved on Dec. 10, 2021], Retrieved from the Internet <https://arxiv.org/pdf/1611.04076.pdf>, Apr. 5, 2017, 16 pages.
Marschner, Stephen R, et al., "Inverse Lighting for Photography", Color Imaging Conference [retrieved Dec. 10, 2021]. Retrieved from the Internet <http://www.cs.cornell.edu/~srm/publications/CIC97-invlig.pdf>., Nov. 1997, 4 Pages.
Mildenhall, Ben , et al., "NeRF: Representing Scenes as Neural Radiance Fields for View Synthesis", Cornell University arXiv, arXiv.org [retrieved Dec. 10, 2021]. Retrieved from the Internet <https://arxiv.org/pdf/2003.08934.pdf>., Aug. 3, 2020, 25 Pages.
Nalbach, Oliver , et al., "Deep Shading: Convolutional Neural Networks for Screen Space Shading", Cornell University arXiv. arXiv.org [retrieved Dec. 10, 2021]. Retrieved from the Internet <https://arxiv.org/pdf/1603.06078.pdf>., Aug. 3, 2016, 12 Pages.
Nestmeyer, Thomas , et al., "Learning Physics-Guided Face Relighting Under Directional Light", Cornell University arXiv, arXiv.org [retrieved Dec. 10, 2021]. Retrieved from the internet <https://arxiv.org/pdf/1906.03355.pdf>., Apr. 19, 2020, 10 Pages.
Nguyen-Phuoc, Thu , et al., "HoloGAN: Unsupervised Learning of 3D Representations From Natural Images", Cornell University arXiv, arXiv.org [retrieved Dec. 10, 2021]. Retrieved from the Internet <https://arxiv.org/pdf/1904.01326.pdf>., Oct. 1, 2019, 10 Pages.
Nishita, Tomoyuki , et al., "Display of the earth taking into account atmospheric scattering", SIGGRAPH '93: Proceedings of the 20th annual conference on Computer graphics and interactive techniques [retrieved Dec. 10, 2021]. Retrieved from the Internet <http://nishitalab.org/user/nis/cdrom/sig93_nis.pdf>., Sep. 1, 1993, 8 Pages.
Pandey, Rohit , et al., "Total relighting: learning to relight portraits for background replacement", ACM Transactions on Graphics, vol. 40, No. 4 [retrieved Dec. 10, 2021]. Retrieved from the Internet <https://augmentedperception.github.io/total_relighting/total_relighting_paper.pdf>., Jul. 19, 2021, 21 Pages.
Peers, Pieter , et al., "Post-production facial performance relighting using reflectance transfer", ACM Transactions on Graphics, vol. 26, No. 3 [retrieved Dec. 10, 2021]. Retrieved from the Internet <https://vgl.ict.usc.edu/Research/PFPR/SIGGRAPH2007_PFPR_low.pdf>., Jul. 29, 2007, 10 Pages.
Philip, Julien , et al., "Free-viewpoint Indoor Neural Relighting from Multi-view Stereo", ACM Transactions on Graphics, Association for Computing Machinery [retrieved Dec. 10, 2021]. Retrieved from the Internet <https://hal.inria.fr/hal-03265780v2/document>., Jun. 24, 2021, 19 Pages.
Philip, Julien , et al., "Multi-view Relighting Using a Geometry-Aware Network", ACM Transactions on Graphics (SIGGRAPH Conference Proceedings), vol. 38, No. 4 [retrieved Dec. 6, 2021]. Retrieved from the Internet <http://www-sop.inria.fr/reves/Basilic/2019/PGZED19/>., Jun. 4, 2019, 2 Pages.
Prasad, Vignesh , et al., "Epipolar Geometry based Learning of Multi-view Depth and Ego-Motion from Monocular Sequences", Cornell University arXiv, arXiv.org [retrieved Dec. 10, 2021]. Retrieved from the Internet <https://arxiv.org/pdf/1812.11922.pdf>., Dec. 18, 2018, 10 Pages.
Qu, Liangqiong , et al., "DeshadowNet: A Multi-Context Embedding Deep Network for Shadow Removal", 2017 IEEE Conference on Computer Vision and Pattern Recognition (CVPR) [retrieved Dec. 10, 2021]. Retrieved from the Internet <https://openaccess.thecvf.com/content_cvpr_2017/papers/Qu_DeshadowNet_A_Multi-Context_CVPR_2017_paper.pdf>., Jul. 2017, 9 Pages.
Ranftl, René , et al., "Towards Robust Monocular Depth Estimation: Mixing Datasets for Zero-shot Cross-dataset Transfer", Cornell University arXiv, arXiv.org [retrieved Dec. 10, 2021]. Retrieved from the Internet <https://arxiv.org/pdf/1907.01341.pdf>., Aug. 25, 2020, 14 Pages.
Ritschel, Tobias , et al., "Approximating Dynamic Global Illumination in Image Space", in Proceedings of I3D 2009 [retrieved Dec. 10, 2021]. Retrieved from the Internet <http://www.mpi-inf.mpg.de/~ritschel/Papers/SSDO.pdf>., Feb. 27, 2009, 8 pages.
Ronneberger, Olaf , et al., "U-Net: Convolutional Networks for Biomedical Image Segmentation", Cornell University arXiv, arXiv.org [retrieved Feb. 24, 2022]. Retrieved from the Internet <https://arxiv.org/pdf/1505.04597.pdf>., May 18, 2015, 8 pages.
Sanin, Andres , et al., "Shadow detection: A survey and comparative evaluation of recent methods", Pattern Recognition, vol. 45, No. 4 [retrieved Dec. 10, 2021]. Retrieved from the Internet <http://citeseerx.ist.psu.edu/viewdoc/download?doi=10.1.1.374.4029&rep=rep1&type=pdf>., Apr. 1, 2012, 22 Pages.
Sheng, Yichen , et al., "SSN: Soft Shadow Network for Image Compositing", Cornel University arXiv, arXiv.org [retrieved Dec. 10, 2021]. Retrieved from the Internet <https://arxiv.org/pdf/2007.08211.pdf>., Apr. 1, 2021, 11 Pages.
Shu, Zhixin , et al., "Neural Face Editing With Intrinsic Image Disentangling", Cornell University arXiv, arXiv.org [retrieved Dec. 10, 2021]. Retrieved from the Internet <https://arxiv.org/pdf/1704.04131.pdf>., Apr. 13, 2017, 22 Pages.

\* cited by examiner

900

902
Receive a two-dimensional digital image, a direction of propagation, and a depth map defining depths within an environment captured by the digital image

904
Detect a color of pixels from the digital image at respective steps of a plurality of steps marched along the direction

906
Detect a map depth from the depth map at the respective steps of a plurality of steps marched along the direction

908
Detect a direction depth as a depth of a point along a ray corresponding to the direction at the respective steps of the plurality of steps marched along the direction

910
Define corresponding depths for the pixels as ratios based on the map depth and the direction depth

912
Generate a feature volume including three-dimensional stacked features based on the color and the corresponding depths of the pixels

Fig. 9

DIRECTIONAL EDITING OF DIGITAL IMAGES

BACKGROUND

Digital images are used to capture visual nuances in both virtual and real-world environments. Interaction of these nuances defines both what is captured in the digital image, conveys when the digital image is captured, and so on. A digital image, for instance, typically captures a snapshot of an environment at a particular point in time and the visual nuances captured in the digital image define the characteristics of that point in time, e.g., time of day and occurrences that happened at that time of day. Consequently, inaccuracies in editing the digital image have a direct effect on what is conveyed by the digital image.

Consider an example in which a digital image is captured of an outdoor environment. Lighting and corresponding shadows captured in the digital image with respect to that environment readily convey a relationship of objects to each other, a time-of-day at which the image is captured (e.g., by length of shadows), and so forth. Consequently, any inaccuracies involving edits that do not account for accurate lighting and corresponding shadows cause visual artifacts that are readily noticeable with respect to any of these nuances. The visual artifacts, for instance, are noticeable as visual inconsistencies in the lighting and shadows which cause the edits and conventional image processing systems that support these edits to fail.

Techniques used by conventional image processing systems to increase accuracy in digital image editing techniques, however, typically fail due to an inability to accurately describe a three-dimensional geometry within the digital image. Conventional techniques to perform ray tracing, for instance, operate well in instances in which a precise and accurate three-dimensional geometry of an environment is available. However, availability of such 3D geometries is limited.

Thus, these techniques are not usable in typical real-world scenarios in which a two-dimensional digital image is available without a corresponding geometry. This is because these conventional techniques fail when using less accurate techniques to define the 3D geometry of an environment captured by the digital image, e.g., depth maps. These inaccuracies, for instance, result in an inability of a conventional image processing system to accurately determine how to propagate light through an environment captured by the digital image, and thus how to create shadows based on this propagation. As such, conventional editing techniques are not available for a vast majority of digital images, are inaccurate, and cause computing devices to fail in achieving these edits.

SUMMARY

Directional editing techniques are described that improve image editing accuracy, operation of a computing device that implements these techniques, and are usable to a wider range of digital images. In one example, a digital image and a depth map are obtained by an image editing system. A direction of propagation is also received as an input by the image editing system. The image editing system then generates features based on the direction, the digital image, and the depth map. To do so, the image editing system generates features from the digital image and the depth map for each pixel based on the direction, e.g., until an edge of the digital image is reached.

In an implementation, instead of storing a value of the depth directly, a ratio is stored based on a depth in the depth map and a depth of a point along the direction, e.g., a three-dimensional direction. The image editing system then forms a feature volume using the features, e.g., as three-dimensionally stacked features. The feature volume is employed by the image editing system as part of editing the digital image to form an edited digital image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 9 is a flow diagram depicting a procedure in an example implementation involving feature volume generation using ratios to define depths.

DETAILED DESCRIPTION

Overview

Figure 1:
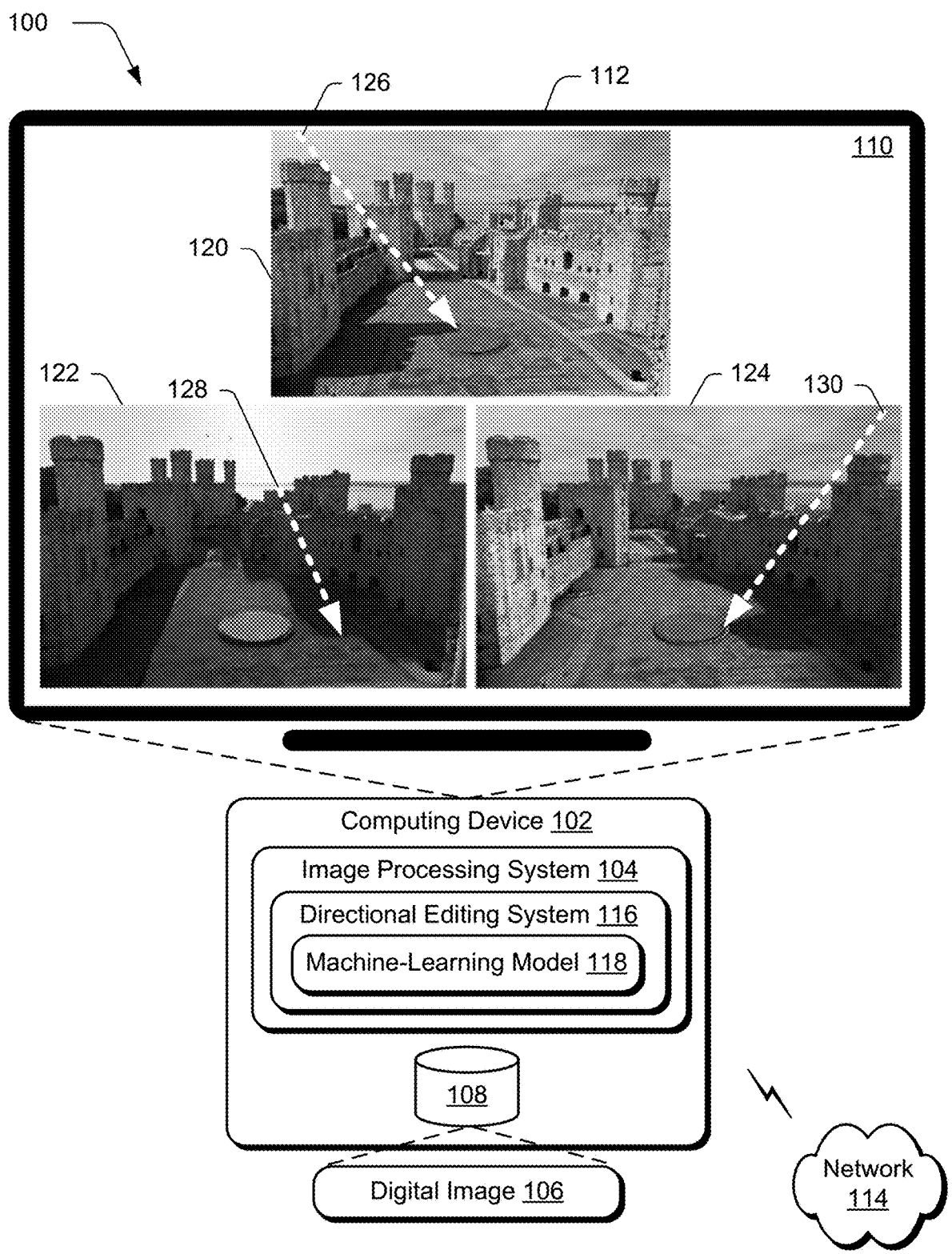
FIG. 1 is an illustration of a digital medium environment in an example implementation that is operable to employ directional editing techniques described herein.

Editing techniques supported by image processing systems are confronted with numerous challenges. One example of this is caused by complexity of an environment captured by the digital image and interaction of objects within the environment with each other. Certain types of edits made to these environments, for instance, are dependent on an accurate understanding of an underlying three-dimensional geometry of the environment.

Examples of this certain type of edit include addressing propagation of mediums and/or actions along a direction within the environment. An edit involving propagation of a medium in the environment, for instance, includes propagation of light, air, water, solids (e.g., smoke), and so forth along a direction. An edit involving propagation of an action in the environment includes sound, fire, and so forth. Other examples are also contemplated.

In each of these examples, edits made to the digital image are dependent, conventionally, on an accurate understanding of the three-dimensional geometry of the environment. Understanding of a three-dimensional geometry goes beyond a depth map of the environment. A depth map indicates a nearest depth at respective points in environment but does not provide information regarding what happens behind that point. For example, a depth map that includes a side-view of a wall and a lamppost would be represented the same within the depth map. Therefore, propagation of mediums or actions within this environment using the depth map are treated the same in conventional techniques, which causes errors. For example, a shadow cast based on a side view of the wall matches a shadow cast behind the lamppost in conventional techniques.

Accordingly, directional propagation editing techniques are described that overcome conventional challenges that are limited to a detailed understanding of a three-dimensional geometry of an environment. As such, these techniques improve image editing accuracy, operation of a computing device that implements these techniques, and are usable to a wider range of digital images, e.g., digital images in which a detailed understanding of a three-dimensional geometry is not available.

In one example, a digital image is obtained by an image editing system. The digital image, for instance, is captured as a two-dimensional digital image having colors at respective pixels using an image sensor of a device. Virtual scenarios are also contemplated in which an environment within the digital image is composed by an artist, part of a virtual environment (e.g., cartoon), and so forth. A depth map is also obtained. Continuing with the first scenario above, the depth map is also captured that measures depths at corresponding points (e.g., pixels) within a physical environment. In the other scenarios, a depth map captured using depth sensors is not available. Accordingly, a depth map is generated by the image editing system using a machine-learning model, e.g., through use of a convolutional neural network that is trained to detect depth at respective points in the digital image solely from the two-dimensional digital image, e.g., through use of disparity detection techniques.

A direction of propagation is also received as an input by the image editing system. A user interface, for instance, is output that includes a rendering of the digital image. The input is then specified as a direction of propagation (which may also include more than one direction) with respect to the digital image. The input, for instance, specifies a direction or directions that light is to propagate within the digital image. This is useable to perform edits to change a direction of shadows within the digital image, which is also known as "relighting" the digital image.

The image editing system then generates features based on the direction, the digital image, and the depth map. To do so, the image editing system generates features from the digital image and the depth map for each pixel based on the direction, e.g., until an edge of the digital image is reached. The steps, for instance, define successive distances along the direction from the pixel. At each of those successive distances, a sample from the digital image is taken (e.g., a color of a respective pixel at that location in the digital image) along with a corresponding sample from the depth map, e.g., a depth at a corresponding location. In an RGB configuration, the color is defined using red, green, and blue color channels with the depth added as a fourth channel In an implementation, instead of storing a value of the depth directly, a ratio is stored based on a depth in the depth map and a depth of a point along the direction in three-dimensions, e.g., along a ray corresponding to the direction at the respective step. The ratio, in this example, is defined between the depth in the depth map and the depth of the point along the ray. The ratio supports increased functionality and accuracy and addresses potential inaccuracies and lack of understanding supported by the depth map in accurately describing the environment. The ratio, for instance, provides additional insight as to whether the ray interests a surface in the digital image, e.g., results in occlusion. When the ratio is close to a value of "one" (e.g., within a threshold), it means that the ray intersects the surface. When the ratio is greater than one and the threshold, the ray is disposed "in front" of the surface, and when the ratio is less than one and the threshold, the ray is disposed "behind" the surface.

Further, the ratio is scale-invariant and thus is usable to accurately reflect depth generated using machine learning. For example, a neural network depth estimator module (e.g., as a convolutional neural network) is configured to detect disparity and not "absolute" or "actual" depth values. Therefore, through use of the ratio the disparity that is used as a basis to generate the depth map in conventional machine-learning techniques is usable, which is not possible in conventional techniques.

The image editing system then forms a feature volume using the features. Continuing with the three color channel and one depth channel example above, a volume of a size "X×Y×Z×4" is generated for the "Z" steps, with the four channels including RBG and the depth ratios. The feature volume, as such, defines three-dimensionally stacked features generated from the two-dimensional digital image, depth map, and direction.

The feature volume is then employed by the image editing system as part of editing the digital image to form an edited digital image. In a light propagation and shadow example, the direction defines the direction in which the light is to propagate through the environment. The feature volume defines aspects of that propagation within the environment. The ratio used to define the depth provides insight into potential occlusions. Therefore, a machine-learning model is trained using similar scenarios to learn how to propagate light through different environments and address potential occlusions and placements of objects within the digital image. The machine-learning model, using these techniques, is trainable using feature volumes to differentiate between shadows cast by a lamppost versus a side view of a wall, which is not possible in conventional techniques. In this way, the techniques described herein are applicable to a wide range of digital images, which is not possible in conventional techniques and thus improves operation of computing devices that employ these techniques. Further discussion of these and other examples are described in the following sections. Although directional propagation involving light and shadows is described as an example editing operation in the following discussion, propagation of other types of actions and/or mediums in support of other types of editing operations is also contemplated.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ directional propagation editing techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources, e.g., mobile devices. Additionally, although a single computing device 102 is shown, the computing device 102 is also representative of a plurality of different devices, such as multiple servers utilized by a business to perform operations "over the cloud" as described in FIG. 13.

The computing device 102 is illustrated as including an image processing system 104. The image processing system 104 is implemented at least partially in hardware of the computing device 102 to process and transform a digital image 106, which is illustrated as maintained in a storage device 108 of the computing device 102. Such processing includes creation of the digital image 106, modification of the digital image 106, and rendering of the digital image 106 in a user interface 110 for output, e.g., by a display device 112. Although illustrated as implemented locally at the computing device 102, functionality of the image processing system 104 is also configurable as whole or in part via functionality available via the network 114, such as part of a digital service "in the cloud."

An example of functionality incorporated by the image processing system 104 to process the digital image 106 is illustrated as a directional editing system 116. The directional editing system 116 is configured to address directional propagation of a medium and/or action in editing the digital image 106. In the illustrated example, this edit involves relighting an input digital image 120 to produce first and second edited digital images 122, 124 in which a direction of light and corresponding shadows is changed. In the input digital image 120, the direction 126 of the light is from a top left corner to the bottom right and therefore shadows caused by buildings are propagated from left to right in the image.

For the first edited digital image 122, an input is received by the directional editing system 116 specifying a direction 128 from the back and towards a viewpoint of the image. Accordingly, the directional editing system 116 replaces the shadows from the input digital image 120 with shadows that appear to approach this viewpoint. Likewise, for the second edited digital image 124, an input is received by the directional editing system 116 specifying a direction 130 from a top right towards a bottom left of the image. Accordingly, the directional editing system 116 replaces the shadows from the input digital image 120 with shadows that appear opposite to those in the input digital image 120.

Capture of an outdoor scene as shown in the illustrated examples involves balancing a subtle equilibrium between a subject, composition, and lighting of an environment. Although an artist specifies what subject to capture and is able control the properties of the sensor, obtaining the right lighting introduces additional challenges that often either requires patience and dedication, or is simply out of the artist's control. One hurdle is that an occluding geometry that defines a basis in casting shadows can be arbitrarily far away from a point that receives the shadow. Digital images that capture dramatic shadows (e.g., at sunset or sundown) are notoriously challenging as the shading of a point is typically dependent on an arbitrarily far geometry.

As previously described, when an accurate 3D geometry of an environment is available, cast shadows can be computed using conventional techniques by ray tracing or shadow mapping. In another conventional example, multiple digital images are employed that capture various viewpoints of the environment, which are used to generate a three-dimensional proxy geometry. However, in practice accurate 3D geometries are not available, nor are multiple digital images that exhibit parallax of an environment that are usable to generate a three-dimensional proxy geometry. Accordingly, conventional techniques fail for typical usage scenarios in which a single digital image is available due to limitations involving accuracy in convention depth maps, whether generated from the digital image directly, generated using a dedicated depth sensor, and so on.

The directional editing system 116 is configured to address challenges involving edits that involve directional propagation of a medium and/or an action within an environment using an imperfect depth map. A depth map differs from a global proxy 3D geometry in that conventional techniques used to generate the depth map are both inaccurate and incomplete. Therefore, edits that depend directly on depth maps using conventional techniques produce inaccuracies and incomplete results.

Figure 10:
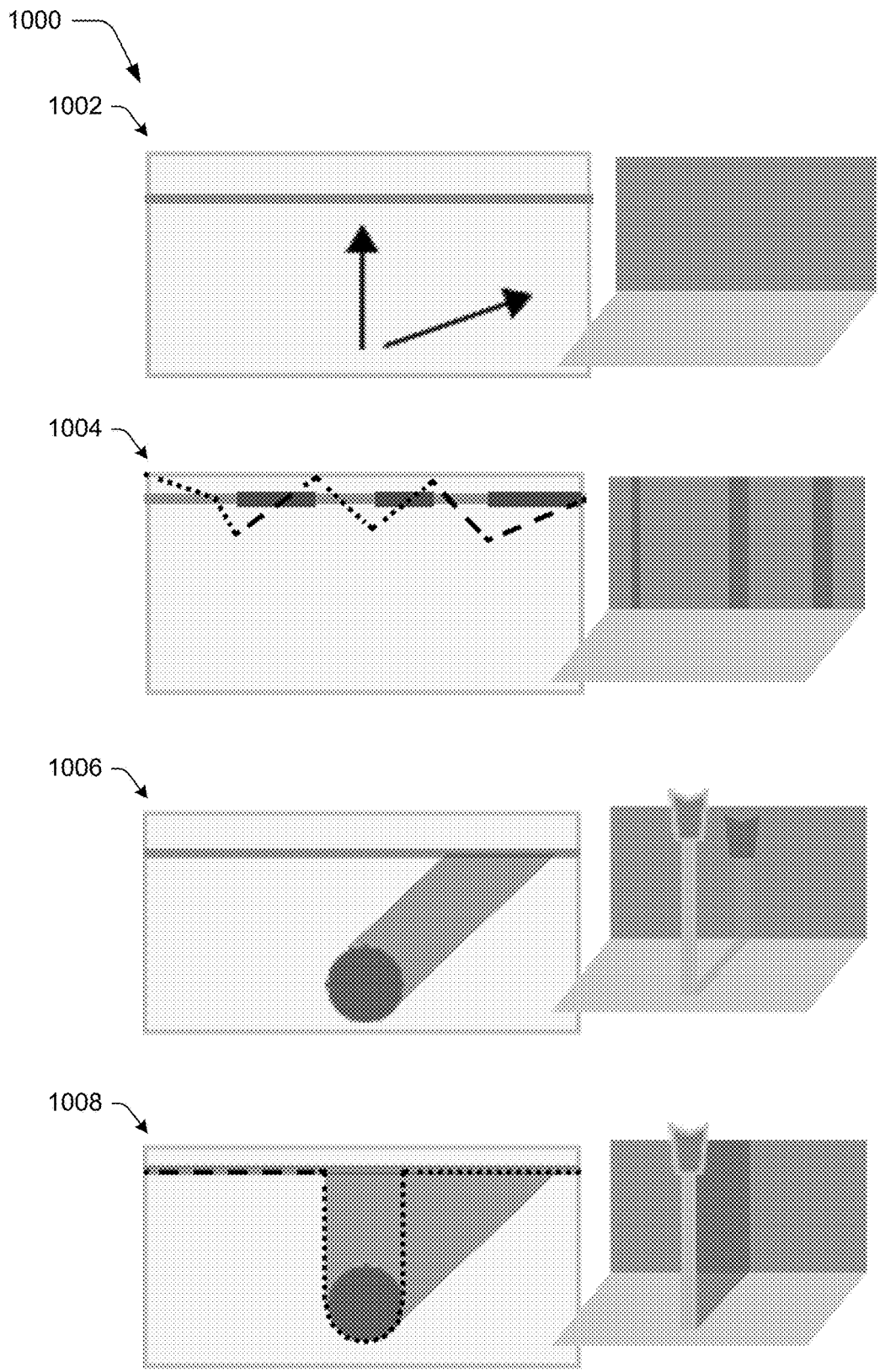
FIG. 10 depicts examples of challenges of depth maps in describing what is behind an object.

Conventional depth estimation techniques, when faced with a single digital image, are inaccurate because these techniques are based on depth disparities and are not able to accurately detect a "true" depth, lack details, and often suffers from distortion. For example, an even ground plane or a side wall of a building facing away from the light as shown at a first stage 1002 of FIG. 10 is typically not captured as a proper plane, but rather appears bumpy and curved as shown at a second stage 1004 of FIG. 10.

These effects are particularly strong for texture objects in a phenomenon known as "texture copying." The bumps and curves above, for instance, when used to compute attached shadows using conventional techniques lead to false positives, e.g., normals computed from a bumpy depth map causes surfaces to sporadically face away from the light. When used during the computation of detached shadows, this creates visual artifacts as small shadows known as "shadow acne" as also shown in the second stage 1004 of FIG. 10

Even in instances in which depth values are contrasted accurately (e.g., through use of a depth sensor), the depth map is still incomplete. This is because a two-dimensional depth map stores a single depth for each pixel. Therefore, for a frontal RGB image of a box, the depth map is not able to communicate how far the box extends behind every pixel. At the third stage 1006 of FIG. 10, for instance, a shadow obtained by naively intersecting a surface created by a depth map is illustrated based on an assumption that the geometry extends indefinitely away from the camera. At the fourth stage 1008, a shadow is illustrated that is determined by intersecting a surface created by a depth and addressing rays that pass behind this surface. As such, the inherent incompleteness of conventional depth maps causes corresponding artifacts.

Figure 11:
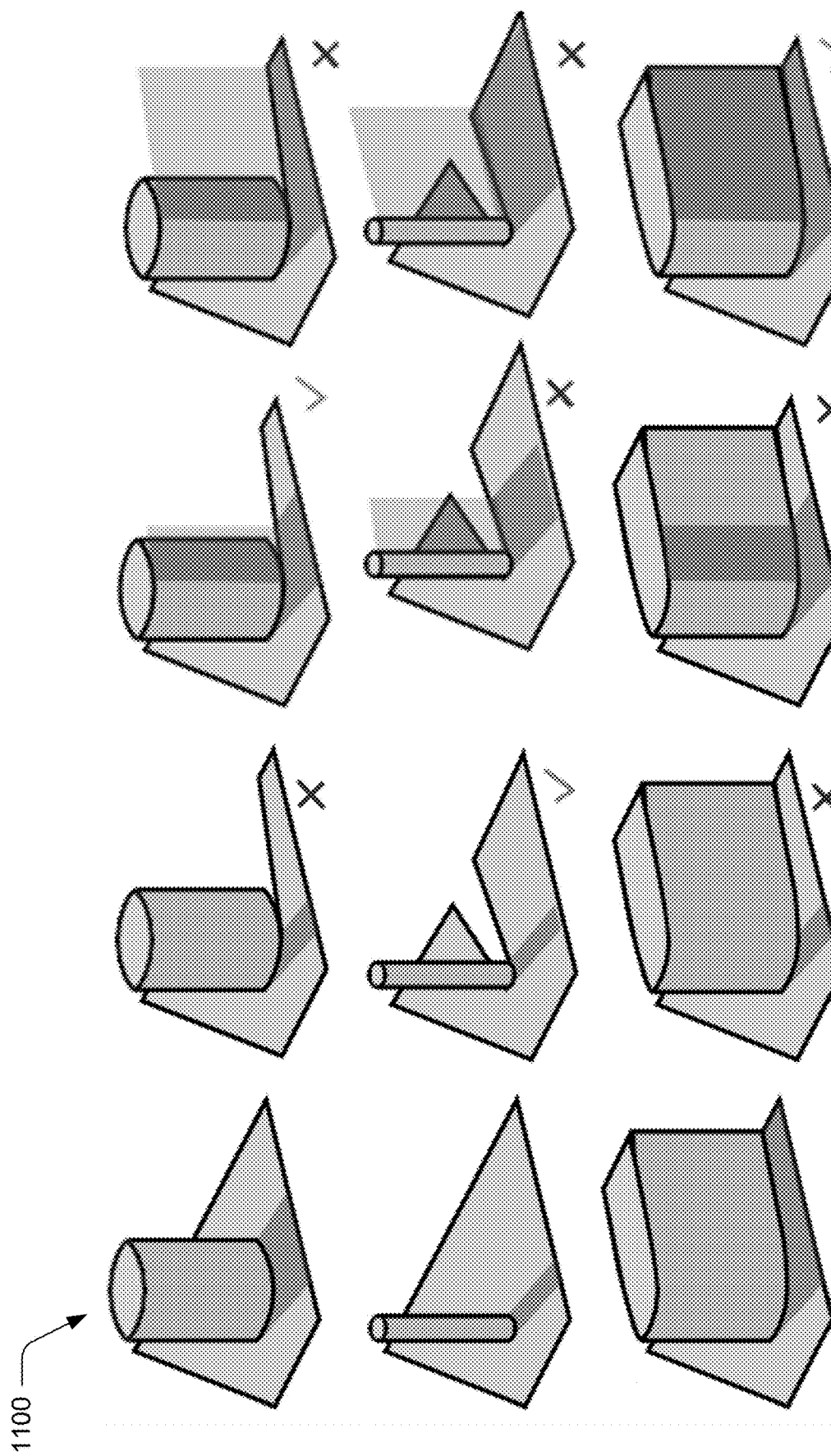
FIG. 11 depicts additional examples of shadow computation from depth maps using thresholding.

FIG. 11 depicts additional examples 1100 of shadow computation from depth maps using thresholding. These examples 1100 depict different geometries along rows and respective cast shadows under different directional shadow casting thresholds along respective columns. A viewpoint (e.g., "camera") is positioned to the left and the light source is positioned to the back with respect to the digital image. The top row geometries are cylinders, however, there is no single threshold that would result in a correct value for both cases. In the techniques described herein, however, the machine-learning model 118 learns to make an occlusion decision adapted to color and depth context.

Figure 12:
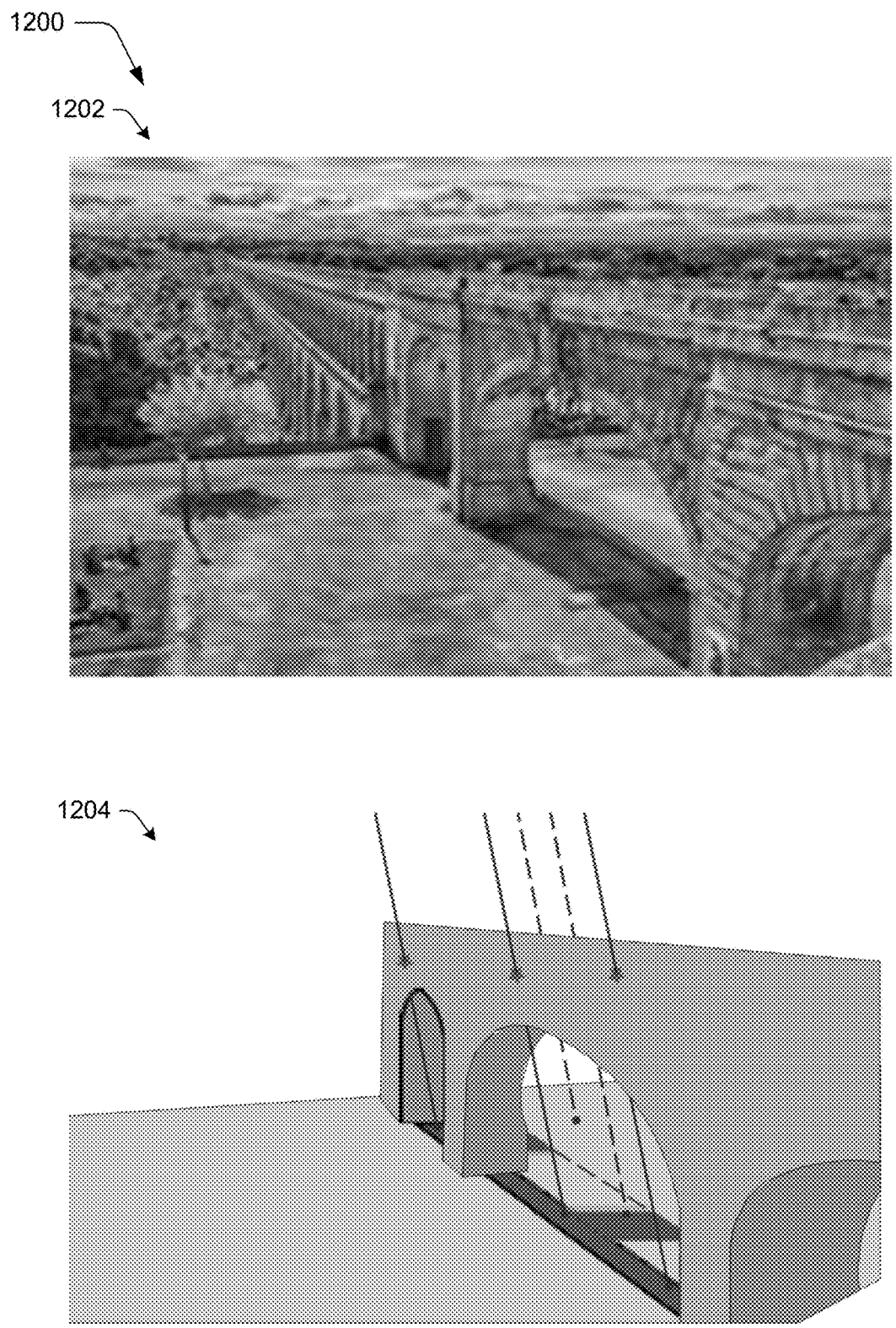
FIG. 12 depicts an example of challenges caused by casting shadows using ray marching directly in a depth map that includes an input image and a schematic representation of surface-based shadow casting.

FIG. 12 depicts an example 1200 of challenges caused by casting shadows using ray marching directly in a depth map that includes an input image 1202 and a schematic representation 1204 of surface-based shadow casting. The solid rays are correctly classified in this example as casting respective shadows based on intersection with the aqueduct. However, the dashed rays are incorrectly classified as not casting a shadow due to an inability to determine thickness of the aqueduct. As such, conventional techniques are incapable of addressing a duality of shadows, such as attached shadows (also known as self-shadows) which are dependent on local surface orientation and cast shadows, which are produced by the presence of an occluder that can be arbitrarily distant.

The directional editing system 116, on the other hand, is configured to employ a machine-learning model 118 that overcomes the challenges such that a single two-dimensional digital image 106 is usable to generate accurate edits. As such, these techniques are available to an increased range of digital images, exhibit improved accuracy, and result in efficient use of computation resources. Further discussion of these and other examples is included in the following section.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Directional Propagation Editing

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-9. In the following discussion, references to the systems are also made in parallel with a procedure 400 of FIG. 4 involving direction editing propagation and a procedure 900 of FIG. 9 involving feature volume generation using ratios to define depths.

Figure 2:
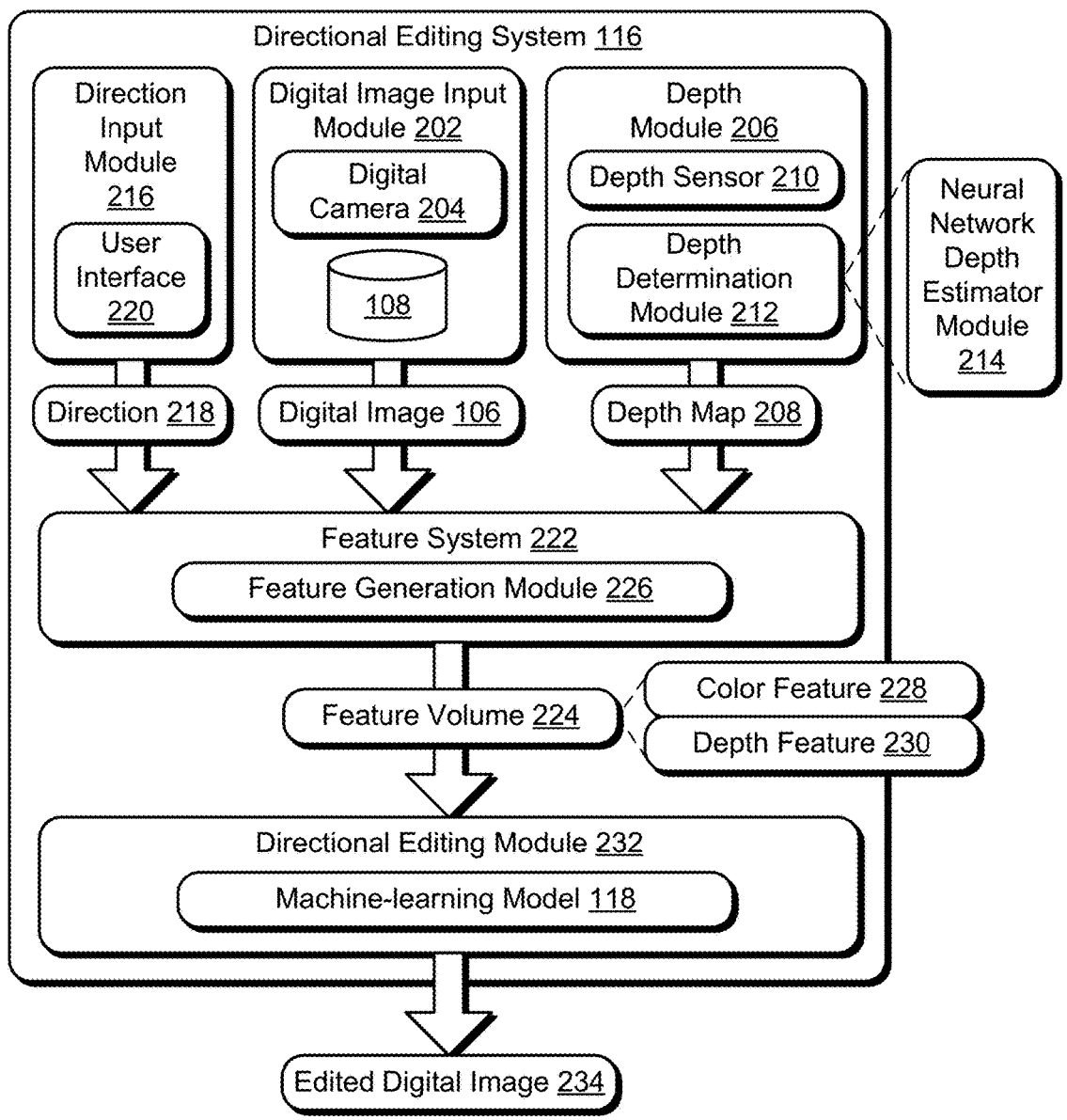
FIG. 2 depicts a system in an example implementation showing operation of a directional editing system of FIG. 1 in greater detail.

FIG. 2 depicts a system 200 in an example implementation showing operation of the directional editing system 116 of FIG. 1 in greater detail. The direction editing system 116 includes a digital image input module 202 configured to receive a digital image 106 (block 402). The digital image 106, in one instance, is captured by an image sensor of a digital camera 204, e.g., of a physical environment. In another instance, the digital image 106 is received from a storage device 108. The digital image 106 is configurable to capture physical environments, virtual environments (i.e., that do not exist in the real world, are recreations of real-world environments), and so on.

The directional editing system 116 also includes a depth module 206. The depth module 206 is configured to receive a depth map 208 defining depths within an environment captured by the digital image (block 404). The depth map 208, for instance, is capturable using a dedicated depth sensor 210 that is configured to detect depths of respective pixels when also captured the digital image 106 by the digital camera 204. The depth sensor 210, for instance, acts as a type of range finder to detect respective depths in the physical environment and then configures the depth map 208 as a type of "heat map" that defines the respective depths, e.g., as absolute values. Examples of depth sensors 210 include time-of-flight cameras, laser rangefinders, infrared projectors, structured light distortion techniques, and so forth. Thus, the depth map 208 is configured to define a depth between an object and a viewpoint (e.g., the digital camera 204), but does not describe "what is behind" that depth.

In another example, a depth determination module 212 is configured to generate the depth map 208 directly from the digital image 106, e.g., without use of information external to the digital image 106. The depth determination module 212, for instance, includes a neural network depth estimator module 214 that includes a trained convolutional neural network. The estimator module 214 is configured to generate the depth map 208 by identifying depth disparities within objects captured by the digital image 106. The neural network depth estimator module 214, for instance, is trained based on training digital images to learn a relative depth of objects within environment captured by the digital images, e.g., based on overlaps, positioning in relation to a ground plane, sizing, etc. Thus, a depth map 208 generated by the depth determination module 212 describes relative depths within the environment but does not include absolute relative depth values, e.g., as generated by the dedicated depth sensor 210.

The directional editing system 116 also includes a direction input module 216 that is configured to receive an input defining a direction 218 of propagation (block 406), e.g., for an action or medium within the environment. The direction input module 216, for instance, outputs a user interface 220, via which, a user input is received to specify the direction 218.

Figure 3:
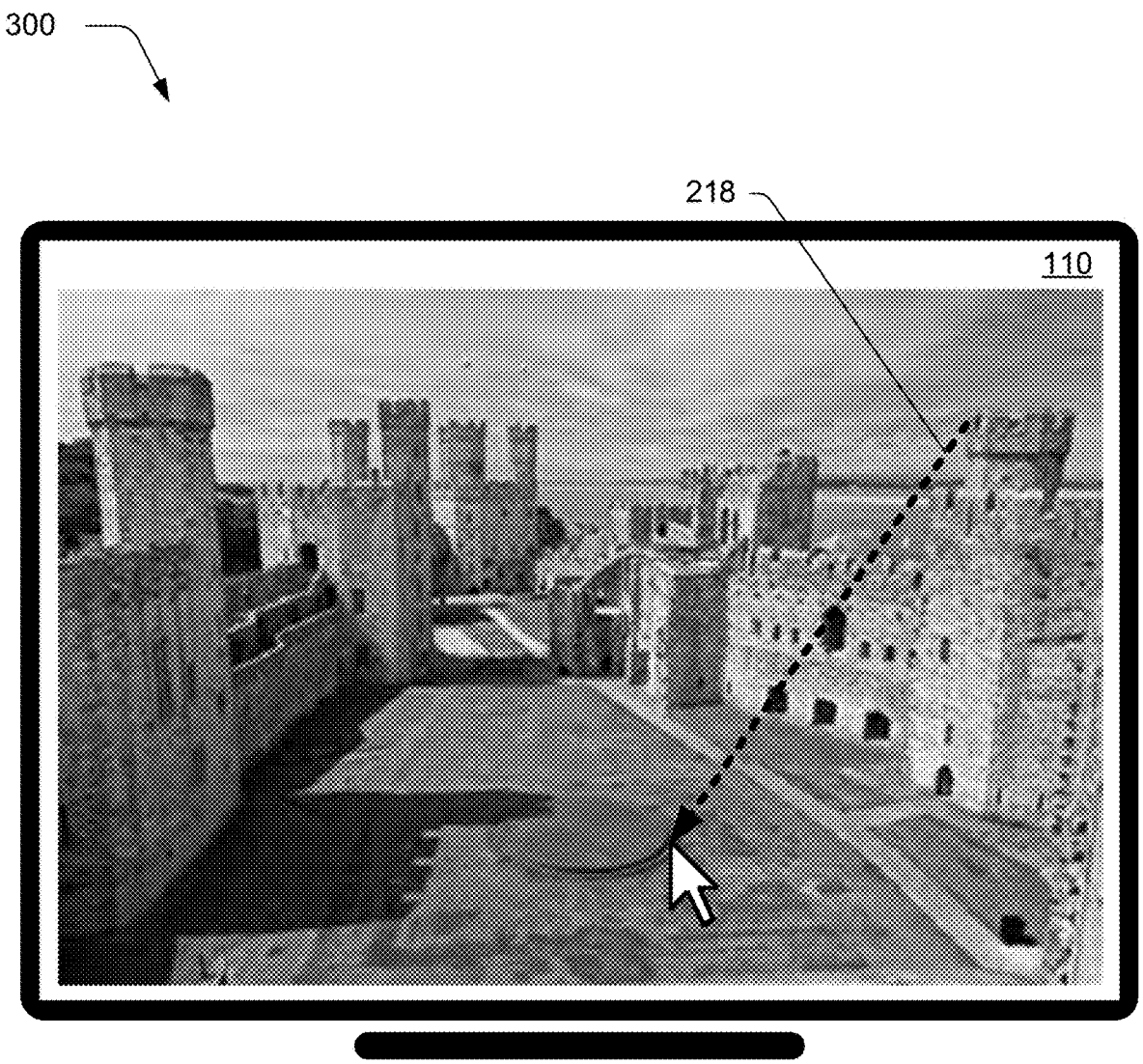
FIG. 3 depicts an example implementation of direction input using a user interface.
Figure 4:
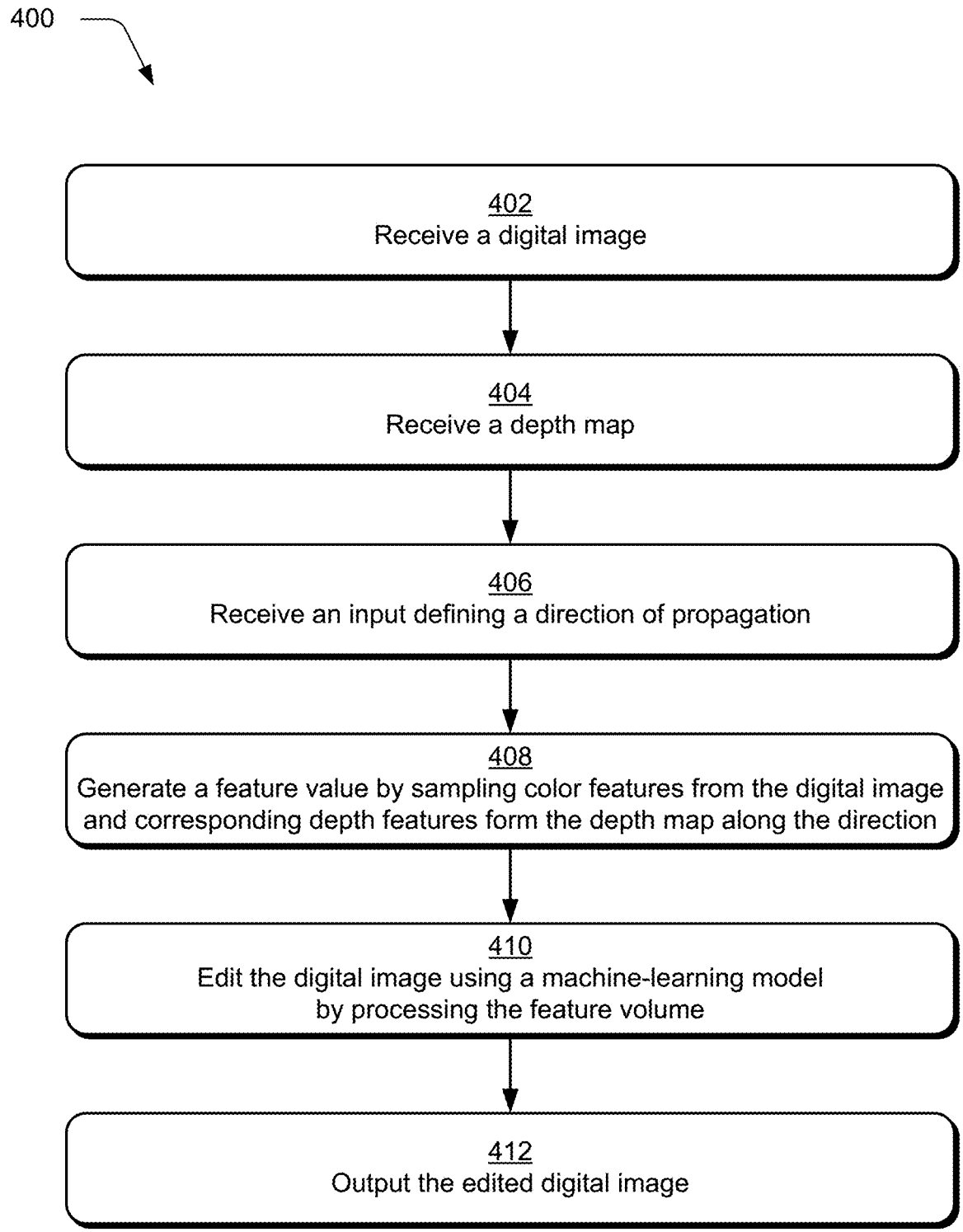
FIG. 4 is a flow diagram depicting a procedure in an example implementation of direction propagation editing of digital images.

FIG. 3 depicts an example implementation 300 of direction input using a user interface. The user interface 110 outputs the digital image 106 that is to be edited. A user input is received via the user interface 110 that specifies the direction 218, e.g., as a click-and-drag using a cursor control device, a gesture detected using a touchscreen, and so forth. Thus, the direction 218 in this example describes rays at respective pixels, along which, an action or medium is to be propagated. Although a single direction is described, use of multiple directions is also contemplated, e.g., to represent light rays emanated for a light depicted in the digital image 106.

The digital image 106, depth map 208, and direction 218 are then passed as inputs to a feature system 222. The feature system 222 is configured to generate a feature volume 224 that is configured to overcome conventional limitations involving use of three-dimensional geometries and the inaccuracies and incompleteness of depth maps when processed using conventional techniques.

To do so, the feature system 22 employs a feature generation module 226 to generate the feature volume 224 by sampling color features 228 from the digital image 106 and corresponding depth features 230 from the depth map 208 along the direction 218 (block 408). The color features 228 describe color of the respective pixels and thus when collected for each of the pixels provides information regarding a relationship of a pixel to local neighbors of the pixel. The depth feature 230 also describes the depth of those pixels. The features are generated at respective steps of a plurality of steps along the direction for each of the pixels, e.g., until an edge of the digital image is reached. As a result, the feature volume 224 provides increased insight into an environment captured by the digital image 106. Further discussion of how the feature volume 224 is generated is described in relation to FIGS. 5-9 in the following discussion.

The feature volume 224 is then passed to a directional editing module 232 for use as a basis to edit the 106 to form an edited digital image 234 using a machine-learning model 118 (block 410), e.g., by processing the feature volume 224. The feature volume 224, as described above, provides additional insight into an underlying environment that is to be the subject of an editing operation, e.g., as a relighting operation. Therefore, the machine-learning model 118 is trainable using a plurality of training digital images and feature volumes to learn nuances of how objects represented by the feature volume 224 correspond to an actual environment. The machine-learning model 118, for instance, once trained using the feature volume is configured to differentiate between views of a side of a wall and a lamppost using the feature volume 224. The machine-learning model 118, once trained in this manner, is also capable of addressing differences between attached shadows and cast shadows using a single model. This is not possible in conventional techniques. The edited digital image 234 is then output (block 412), e.g., to be saved in the storage device 108, rendered in the user interface 110, and so forth. Examples of edits include relighting or propagation of other mediums or actions through the environment, e.g., smoke, wind, sound.

Figure 5:
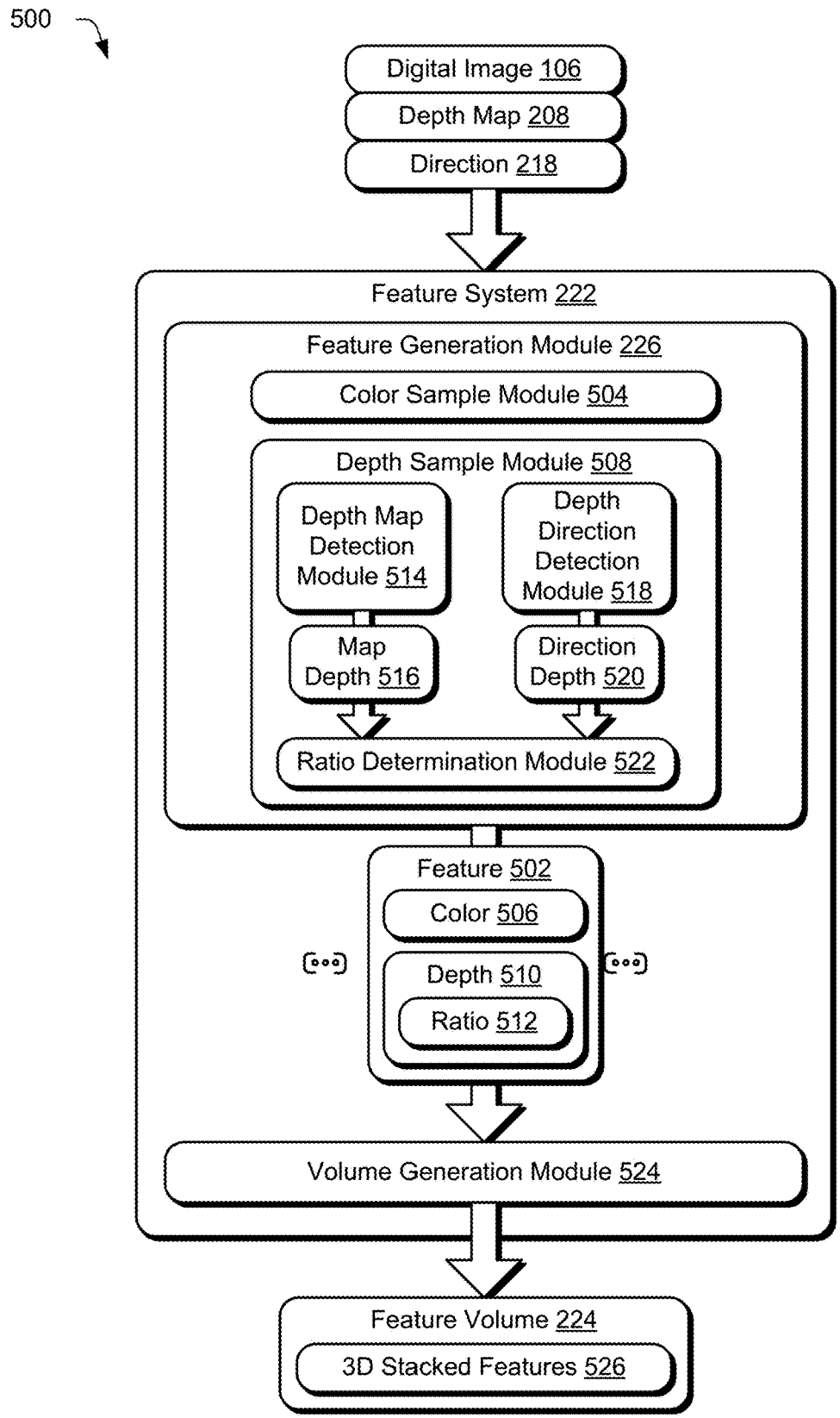
FIG. 5 depicts a system in an example implementation showing operation of a feature system of FIG. 2 in greater detail as generating a feature volume.

FIG. 5 depicts a system 500 in an example implementation showing operation of the feature system 222 of FIG. 2 in greater detail as generating a feature volume 224. This example begins by receiving the digital image 106, the depth map 208, and the direction 218 of propagation (block 902) as described in relation to FIG. 2. The depth map 208 defines depths (e.g., relative and/or absolute) within an environment captured by the digital image 106.

The feature generation module 226 is then configured to generate features 502 at respective steps of a plurality of steps marched along the direction 218, e.g., for pixels of the digital image 106 and corresponding points from the depth map 208. A color sample module 504, for instance, is configured to detect a color 508 (also referred to as a color feature and color value) of pixels from the digital image 106 at respective steps of a plurality of steps marched along the direction (block 904). A depth sample module 508 is configured to detect a depth 510 from the depth map 208 at a point that corresponds to a pixel used to detect the color 508 from the digital image 106.

Therefore, for pixels of the digital image 106 in this example, a defined plurality of "z" steps (e.g., defined as a number of pixels) along a ray that matches the direction, and color values and depth values are sampled at the position. The color 506 is stored in respective channels (e.g., red, green, and blue channels) and the depth 510 is stored in an additional channel, which defines four channels in this example.

Figure 6:
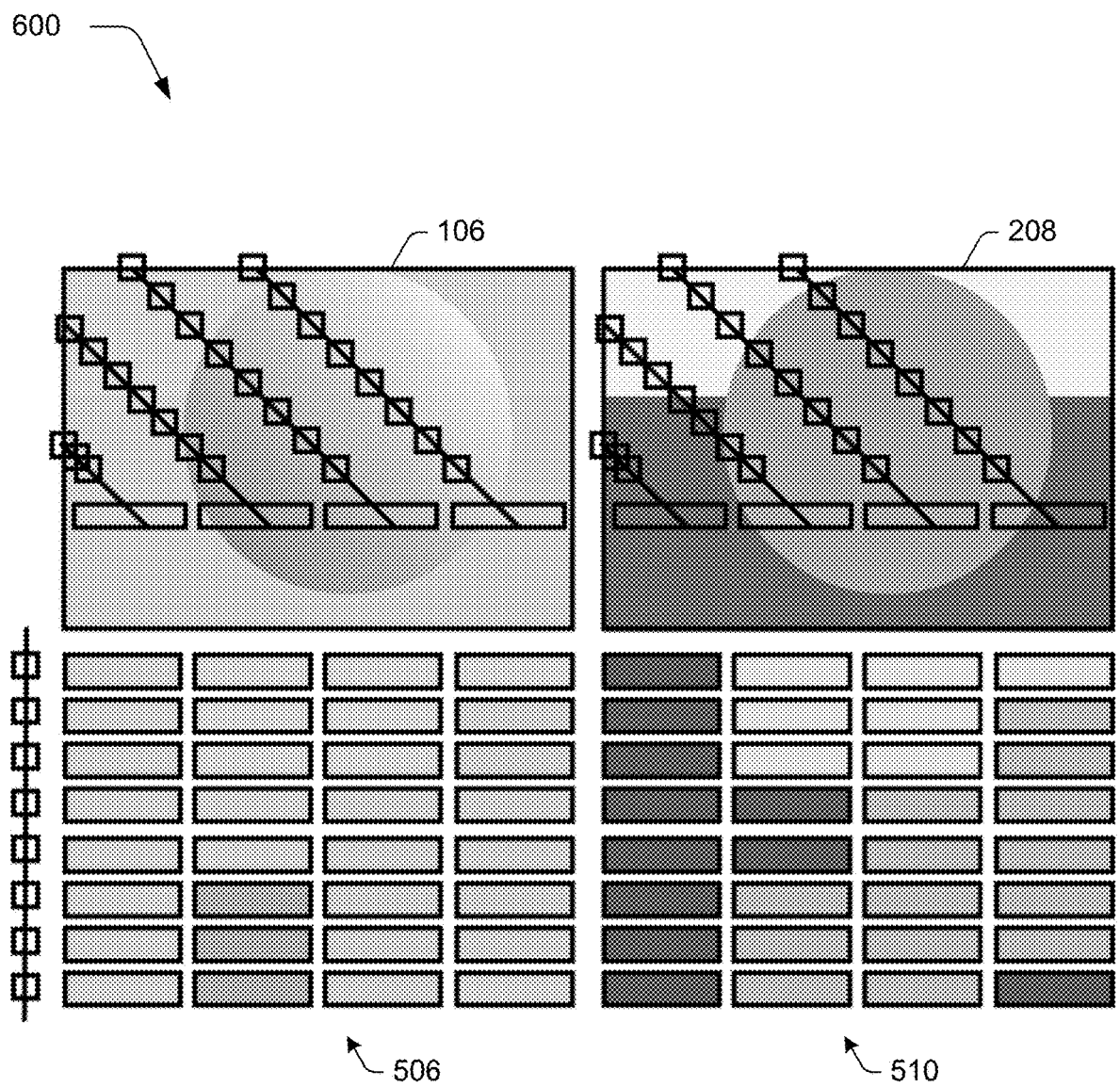
FIG. 6 depicts an example implementation of a ray-marching technique used by the feature generation module of FIG. 2 to generate the features as including color and depth.

FIG. 6 depicts an example implementation 600 of a ray-marching technique used by the feature generation module 226 to generate the features 502 as including the color 506 and depth 510. This example depicts a plurality of steps numbering "eight" along respective rays defined for four respective pixels and points from the digital image 106 and depth map 208 in this example. Colors 506 taken from the digital image 106 are sampled along with depths 510 from the depth map 208. This results in a three-dimensional representation having eight layers, one for each ray-marching step.

In an implementation, rather than directly store a depth from the depth map 208, a ratio 512 is stored instead. To do so, the depth sample module 508 utilizes a depth map detection module 514 to detect a map depth 516 from the depth map 208 (block 906), e.g., that corresponds to the pixel from the digital image 106, for which, the color 506 is detected. A depth direction detection module 518 is also utilized to detect a direction depth 520 based on a depth of a point along the ray (block 908). A ratio determination module 522 is then used to define corresponding depths 510 for the pixels as ratios 512 based on the map depth 516 and the direction depth 520 (block 910).

Figure 7:
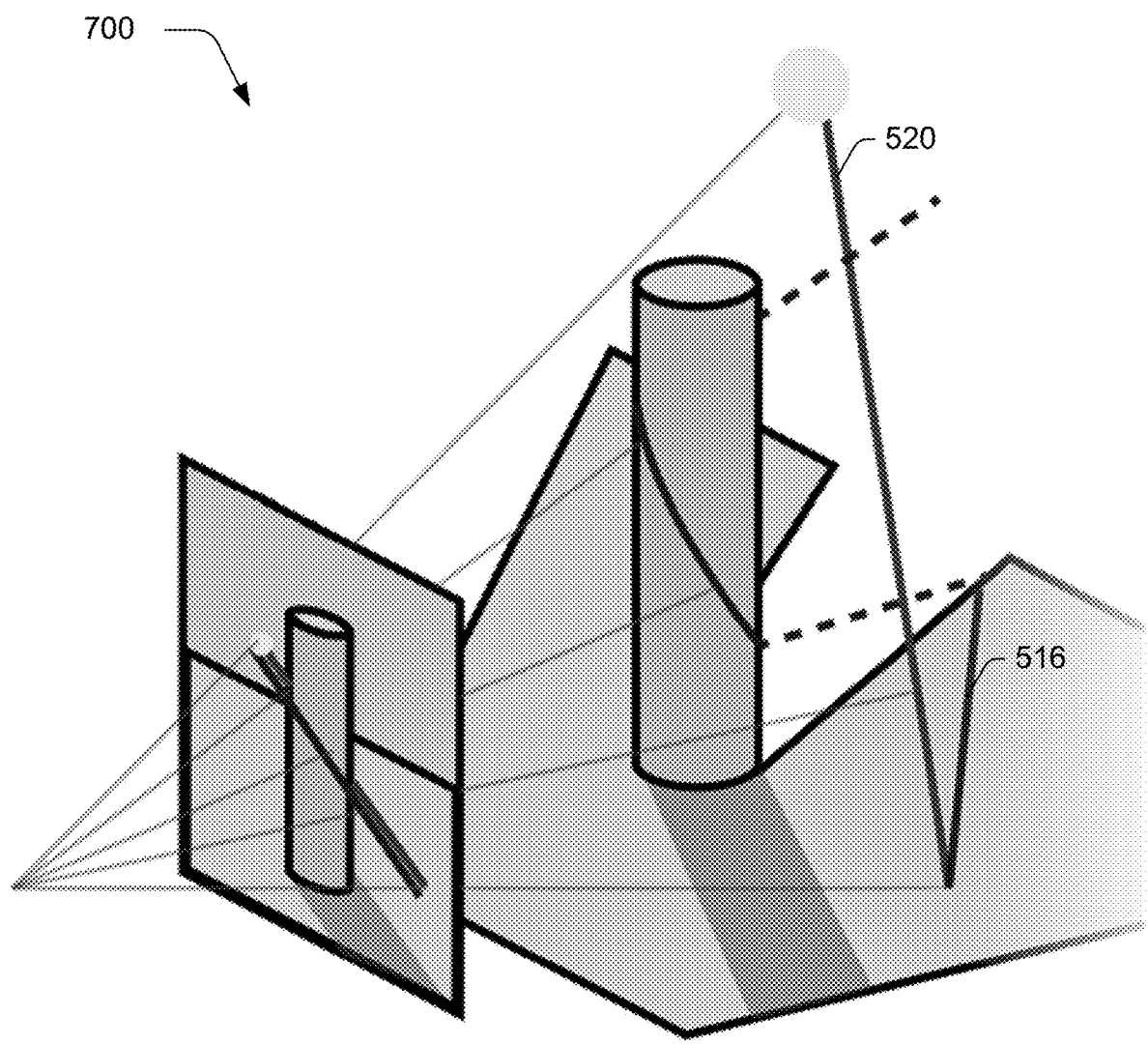
FIG. 7 depicts an example implementation showing ratios based on map depth and direction depth as informing an occlusion decision, e.g., as indicative of intersection with a surface in an environment.

FIG. 7 depicts an example implementation 700 showing ratios based on map depth and direction depth as informing an occlusion decision, e.g., as indicative of intersection with a surface in an environment. In this example, a cylinder captured in a digital image is depicted as casting a shadow and its corresponding projection. Map depths 516 taken from the depth map 208 are illustrated with respect to direction depths 520 taken from a ray corresponding to the direction 218.

The ratio 512, for instance, is defined between the depth in the depth map and the depth of the point along the ray. The ratio supports increased functionality and accuracy and addresses potential inaccuracies and lack of understanding supported by the depth map in accurately describing the environment. The ratio 512, for instance, provides additional insight as to whether the ray intersects a surface in the digital image, e.g., results in occlusion. When the ratio is close to a value of "one" (e.g., within a threshold), it means that the ray intersects the surface. When the ratio is greater than one and the threshold, the ray is disposed "in front" of the surface, and when the ratio is less than one and the threshold, the ray is disposed "behind" the surface.

Further, the ratio 512 is scale invariant and thus is usable to accurately reflect depth generated using machine learning. For example, a neural network depth estimator module (e.g., as a convolutional neural network) is configured to detect disparity and not "absolute" or "actual" depth values. Therefore, through use of the ratio 512 the disparity that is used as a basis to generate the depth map in conventional machine-learning techniques is usable, which is not possible in conventional techniques.

The features 502 are then output to a volume generation module 524 to generate the feature volume 224 as three-dimensional stacked features 526 based on the color 506 and the corresponding depths 510 (e.g., as ratios 512) of the pixels at respective steps of the plurality of steps marched along the direction 218 (block 912). Continuing with the three color channel and one depth channel example above, a volume of a size "X×Y×Z×4" is generated for the "Z" steps, with the four channels including RBG and the depth ratios. The feature volume 224, as such, defines three-dimensionally stacked features (also referred to as "$3D_{feat}$" in the following discussion) generated from the two-dimensional digital image, depth map, and direction. The feature volume 224 is then employed by the machine-learning model 118 as part of editing the digital image 106 to form the edited digital image 234.

Figure 8:
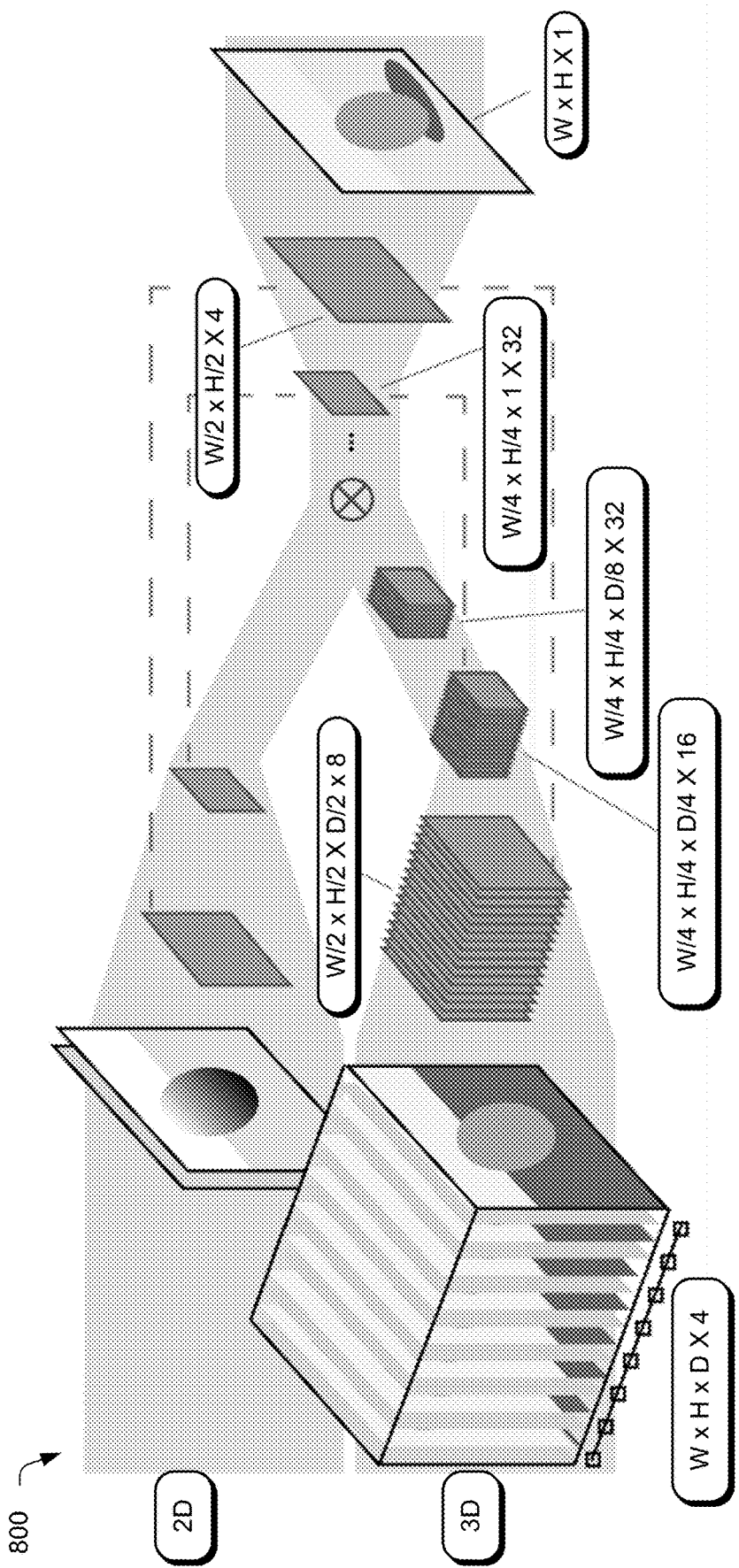
FIG. 8 depicts an example network architecture of the machine-learning model of FIGS. 1 and 2 in greater detail.

FIG. 8 depicts an example network architecture 800 of the machine-learning model 118 of FIGS. 1 and 2 in greater detail. The network architecture 800 includes a 3D-2D encoder-decoder having two encoder heads that maps the "X×Y×Z×4" $3D_{feat}$ volume to a bottleneck size of "X'×Y'×n" using three-dimensional convolution kernels. Application of three-dimensional convolution to the feature volume 224 allows it to march along the ray direction while also accounting for local context.

In parallel, two-dimensional features (e.g., "$2D_{feat}$") are also encoded by the network architecture 800 to a "X'×Y'×n" image using two-dimensional convolution kernels. Finally, a decoder maps the maximum of the encoded two-dimensional and three-dimensional features back to an image of size "X×Y" with a single channel using two-dimensional convolutions. For the skip connections from the three-dimensional branch to the two-dimensional decoder, a linear layer is used to match the volume sizes.

In the illustrated network architecture 800, the feature volume 224 is fed into a three-dimensional encoder branch that reduces each dimension by half in three steps, while doubling a feature count. This enables the network architecture 800 to account for immediate local neighbors near the ray but restrict the network architecture 800 from computing spatially global features across the image plane. This is followed by steps that keep spatial resolution in the volume height and width but reduce the depth dimension to one. As recited above, this is decoded into a two-dimensional digital image, i.e., the edited digital image 234. An additional two-dimensional branch is provided the approximate a Lambertian term, that is two-dimensionally encoded. On the decoding step the two-dimensional and two-dimensional branches share features illustrated by the connecting lines.

In this way, the techniques described herein are applicable to a wide range of digital images, which is not possible in conventional techniques and thus improves operation of computing devices that employ these techniques. Although directional propagation involving light and shadows is described above as an example editing operation, propagation of other types of actions and/or mediums in support of other types of editing operations is also contemplated.

Example System and Device

Figure 13:
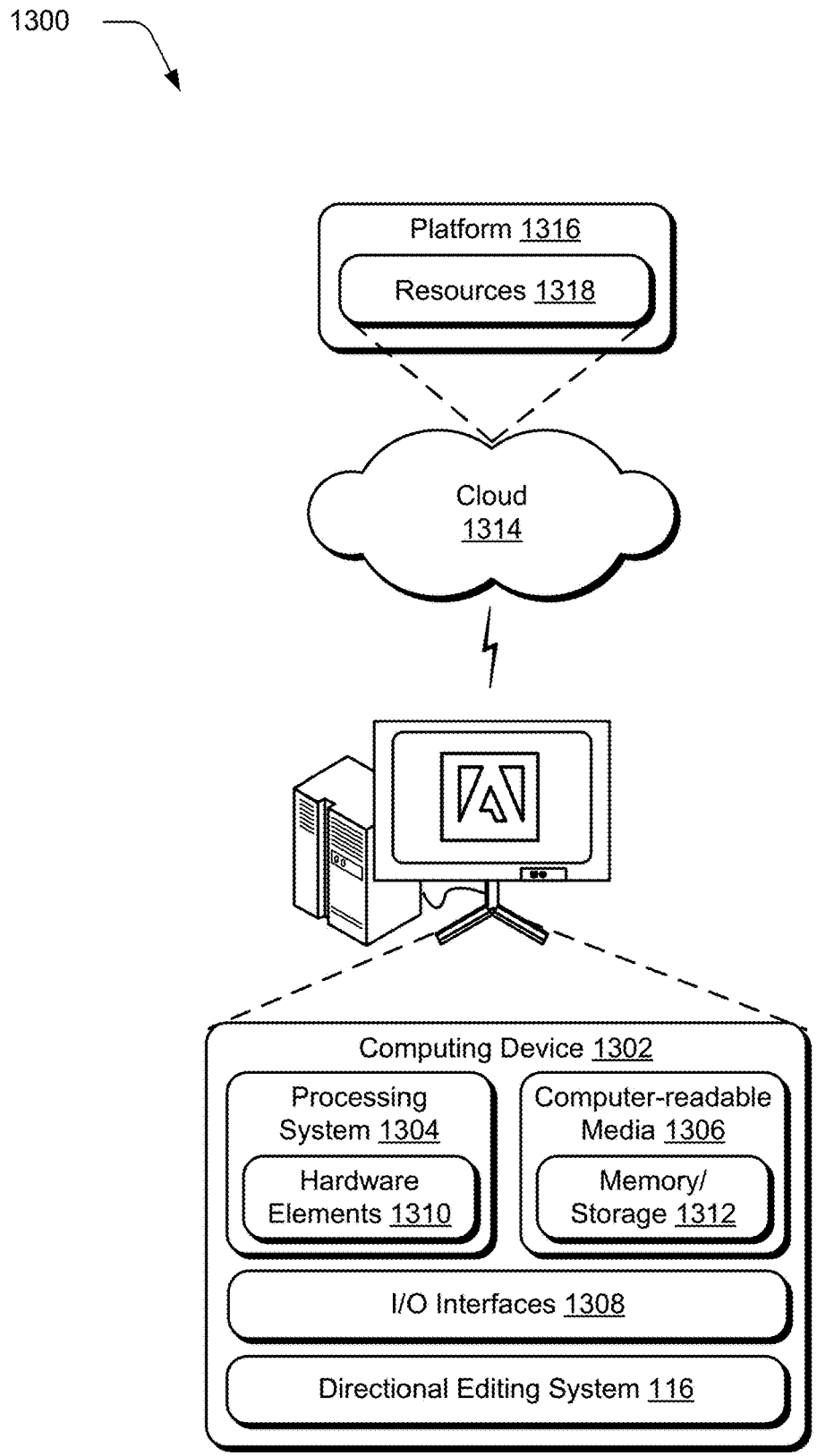
FIG. 13 illustrates an example system generally at that includes an example computing device that is representative of one or more computing systems and/or devices that implement the various techniques described herein.

FIG. 13 illustrates an example system generally at 1300 that includes an example computing device 1302 that is representative of one or more computing systems and/or devices that implement the various techniques described herein. This is illustrated through inclusion of the directional editing system 116. The computing device 1302 is configurable, for example, as a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that is configurable as processors, functional blocks, and so forth. This includes implementation in hardware as an application specific integrated circuit or other logic device formed using one or more semiconductors. The hardware elements 1310 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1306 is illustrated as including memory/storage 1312. The memory/storage 1312 represents memory/storage capacity associated with one or more computer-readable media. The memory/storage 1312 includes volatile media (such as random access memory (RAM)) and/or nonvolatile media (such as read only memory (ROM), Flash memory, optical disks, magnetic disks, and so forth). The memory/storage 1312 includes fixed media (e.g., RAM, ROM, a fixed hard drive, and so on) as well as removable media (e.g., Flash memory, a removable hard drive, an optical disc, and so forth). The computer-readable media 1306 is configurable in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1302. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1302, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1310. The computing device 1302 is configured to implement particular instructions and/or functions corresponding to the software and/or hardware modules. Accordingly, implementation of a module that is executable by the computing device 1302 as software is achieved at least partially in hardware, e.g., through use of computer-readable storage media and/or hardware elements 1310 of the processing system 1304. The instructions and/or functions are executable/operable by one or more articles of manufacture (for example, one or more computing devices 1302 and/or processing systems 1304) to implement techniques, modules, and examples described herein.

The techniques described herein are supported by various configurations of the computing device 1302 and are not limited to the specific examples of the techniques described herein. This functionality is also implementable all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 abstracts resources and functions to connect the computing device 1302 with other computing devices. The platform 1316 also serves to abstract scaling of resources to provide a corresponding level of scale to encountered demand for the resources 1318 that are implemented via the platform 1316. Accordingly, in an interconnected device embodiment, implementation of functionality described herein is distributable throughout the system 1300. For example, the functionality is implementable in part on the computing device 1302 as well as via the platform 1316 that abstracts the functionality of the cloud 1314.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   receiving, by the computing device, a digital image and a depth map defining depths within an environment captured by the digital image;
   receiving, by the computing device, an input via a user interface, the input defining a direction of propagation with respect to the digital image;
   generating, by the computing device, a feature volume by sampling color features from the digital image and corresponding depth features from the depth map along the direction, the sampling including:
  detecting a map depth from the depth map;
  detecting a direction depth as a depth of a point along a ray corresponding to the direction; and
  generating the corresponding depth as a ratio based on the map depth and the direction depth;
editing, by the computing device, the digital image using a machine-learning model by processing the feature volume; and
outputting, by the computing device, the edited digital image.

2. The method as described in claim 1, wherein the digital image is a two-dimensional digital image and the feature volume is defined using three-dimensional stacked features formed from the color features and the corresponding depth features at respective steps marched along the direction as part of the sampling.

3. The method as described in claim 2, wherein the feature volume includes a plurality of color channels and a respective depth channel corresponding to the respective steps for respective pixels of the digital image.

4. The method as described in claim 1, wherein the direction of propagation defines a direction of light transport with respect to an environment captured within the digital image.

5. The method as described in claim 1, wherein the editing by the machine-learning model includes relighting shadows defined within the digital image to follow the direction of propagation defined by the input.

6. The method as described in claim 1, wherein the editing by the machine-learning model includes defining an attached shadow that depends on local surface orientation within the digital image and a cast shadow that is produced based on presence of an occlusion at an arbitrary distance within the digital image.

7. The method as described in claim 1, further comprising generating the depth map from the digital image using a neural network depth estimator module.

8. The method as described in claim 1, further comprising generating the depth map using a depth sensor as part of capturing the digital image using an image sensor.

9. The method as described in claim 1, wherein the direction of propagation defines a direction of movement of an action or direction of movement of a medium with respect to the digital image.

10. A system comprising:
  a feature generation module implemented by a processing system to generate features based on a two-dimensional digital image, a direction of propagation, and a depth map defining depths within an environment captured by the digital image, the feature generation module including:
    a color sample module to detect a color of pixels from the digital image at respective steps of a plurality of steps marched along the direction;
    a depth map detection module to detect a map depth from the depth map at respective steps of the plurality of steps marched along the direction;
    a depth direction detection module to detect a direction depth as a depth of a point along a ray corresponding to the direction at the respective steps of the plurality of steps marched along the direction; and
    a ratio determination module defining corresponding depths for the pixels as ratios based on the map depth and the direction depth; and
  a volume generation module to generate a feature volume including three-dimensional stacked features based on the color and the corresponding depths of the pixels at respective steps of the plurality of steps marched along the direction.

11. The system as described in claim 10, wherein the ratios are indicative of whether the direction intersects a surface within the environment captured by the digital image.

12. The system as described in claim 10, further comprising a directional editing module implemented by the processing system to edit the digital image based on the feature volume and output the edited digital image.

13. The system as described in claim 12, wherein the directional editing module is configured to edit the digital image using a machine-learning model by relighting shadows defined within the digital image to follow the direction of propagation.

14. The system as described in claim 13, wherein the relighting by the machine-learning model includes defining an attached shadow that depends on local surface orientation within the digital image and a cast shadow that is produced based on presence of an occlusion at an arbitrary distance within the digital image.

15. The system as described in claim 10, wherein the direction of propagation defines a direction of an action with respect to the digital image.

16. The system as described in claim 15, wherein the action involves sound or fire.

17. The system as described in claim 15, wherein the direction of propagation defines a direction of movement of a medium with respect to the digital image.

18. The system as described in claim 17, where the movement of the medium includes movement of light, air, water, or solids.

19. A system comprising:
  means for generating features based on a two-dimensional digital image, a direction of propagation, and a depth map defining depths within an environment captured by the digital image;
  means for generating a feature volume including three-dimensional stacked features based on the features, the generating means includes means for sampling color features from the digital image and corresponding depth features from the depth map along the direction, the sampling means including:
    means for detecting a map depth from the depth map;
    means for detecting a direction depth as a depth of a point along a ray corresponding to the direction; and
    means for generating the corresponding depth as a ratio based on the map depth and the direction depth; and
  means for editing the two-dimensional digital image using a machine-learning model by processing the feature volume.

20. The system as described in claim 19, wherein the digital image is a two-dimensional digital image and the feature volume is defined using three-dimensional stacked features formed from the color features and the corresponding depth features at respective steps marched along the direction.

* * * * *